United States Patent [19]

Senuma et al.

[11] 4,380,857
[45] Apr. 26, 1983

[54] PROCESS FOR MANUFACTURING SHUTTER SCREEN BLADES

[75] Inventors: Michio Senuma, Tokyo; Jun Shibuya, Chichibu, both of Japan

[73] Assignees: Canon Kabushiki Kaisha, Tokyo; Canon Denshi Kabushiki Kaisha, Saitama, both of Japan

[21] Appl. No.: 280,933

[22] Filed: Jul. 6, 1981

[30] Foreign Application Priority Data

Jul. 7, 1980 [JP] Japan ................................ 55-92892

[51] Int. Cl.³ .......................... B23P 17/00; B21J 11/00
[52] U.S. Cl. ......................................... 29/417; 72/405
[58] Field of Search ............................ 72/405; 29/417

[56] References Cited

U.S. PATENT DOCUMENTS 4,026,226 5/1977 Hahn et al. ..................... 113/1 F
4,130,933 12/1978 Demrick .............................. 29/564

*Primary Examiner*—Francis S. Husar
*Assistant Examiner*—Steven E. Nichols

[57] ABSTRACT

A process for manufacturing blades of shutter screens wherein the blades are first formed by punching a metal plated thin plastic sheet material by a first press operation carried out thereon with end parts left connected with other portions of the plastic material. After being coated with a coating material and dried under this condition, the connecting end parts of the blades are cut off the material by a second press operation.

1 Claim, 9 Drawing Figures

PROCESS FOR MANUFACTURING SHUTTER SCREEN BLADES

BACKGROUND OF THE INVENTION

1. Field of the Invention

This invention relates to a process for manufacturing shutter screen blades to be used for a focal plane shutter and a lens shutter or the like and more particularly to a process involving coating and press operations in forming the shutter blades of a focal plane shutter with a metal plated thin plastic sheet material.

2. Description of the Prior Art

In camera equipment, there has existed a need to increase shutter speed and to reduce the load on a motor drive arrangement by reducing the weight of the blades forming shutter screens in focal plane shutters in general. To meet this requirement, the present applicant has previously proposed in Japanese utility model application No. 55-6900 a focal plane shutter in which the shutter screen blades are formed with a plastic material, with the plastic shutter screen blades thus formed being plated with a metal and assembled into a focal plane shutter as shown in FIG. 1 of the accompanying drawing. The structural arrangement of the focal plane shutter is as follows:

FIG. 1 shows the leading screen of the focal plane shutter as having come to a middle point of an aperture. The aperture is provided in a shutter base plate 1 and is arranged to be opened and closed by leading and trailing shutter screens. The trailing shutter screen is composed of constituent blades 4, 5, 6, 7 and 8. Each of the blades is attached to a trailing screen driving arm 2 having a trailing screen driving pin 17 and to a trailing screen auxiliary arm 3 through supporting pins. Further, each of the constituent blades 12, 13, 14, 15 and 16 of the leading shutter screen is attached to a leading screen driving arm 10 having a leading screen driving pin 18 and to a leading screen auxiliary arm 9 through supporting pins respectively. When forces are transmitted to the leading screen driving pin 18 and to the trailing screen driving pin 17 from driving sources which are not shown, the leading and trailing shutter screens are moved by them in parallel with the aperture in such a way as to effect an exposure.

In a focal plane shutter of this type, the shutter screen blades must also have adequate flatness for enhancement of the travelling performance of the shutter screens and for ensuring light shielding capability in addition to the above stated need for reduction in weight. Therefore, in forming these shutter screens with a plastic material to meet the requirement first mentioned in the foregoing, the shutter screen blades must be formed with a flat configuration.

According to conventional methods for manufacturing shutter screen blades, each blade is prepared by coating it after it is obtained from a plastic thin sheet like material by punching the material to form the blade contour. Therefore, when the obverse and reverse surfaces of each screen blade are either coated with different coating materials or separately coated in accordance with the conventional method, the blade tends to warp as shown in FIG. 7. Since blades deformed in such a manner are hardly usable as shutter screen blades for focal plane shutters for reasons as mentioned in the foregoing, they must be rejected. The rejection due to such warping thus has been causing an increase in the cost of shutter screen blades. Besides, since each blade is completely punched out of a plastic thin sheet material with a press operation applied to the entire contour thereof before coating, these blades tend to be scattered by air pressure used in spraying a coating material thereon. In accordance with the conventional method, therefore, it has been difficult to have shutter screen blades efficiently manufactured.

SUMMARY OF THE INVENTION

It is an object of the invention to provide a process for manufacturing shutter screen blades at a low cost and a high rate of efficiency.

It is another object of the invention to provide a process for obtaining shutter screen blades of a high degree of flatness through a simple arrangement.

In accordance with the present invention, a thin sheet-like base plate material is first subjected to a press operation to form most of the contour of each shutter screen blade punched out therefrom with some parts of the blade left connected to the sheet material. Then, the blade is subjected to coating and drying under this condition. With the shutter screen blades processed in this manner, they do not readily warp. After drying, each shutter blade is taken out from the thin sheet material by punching with a press without deformation because the blade is connected to the thin sheet-like material only over a small portion of its contour. During the coating and drying treatments, the shutter screen blades thus remain connected to the sheet-like material. Therefore, they are never blown away by air pressure during the coating treatment. Further, since the thin sheet material is kept in a stretched out state at least during the drying treatment, the shutter screen blades keep their flatness.

Further in accordance with the invention, the longitudinal direction of each shutter screen blade is kept nearly perpendicular to the sheet material feeding direction. Therefore, they do not readily warp even when they are arranged to be treated while the sheet material is continuously fed out from a coiled state.

These and further features of the invention will become apparent from the following detailed description thereof taken in connection with the accompanying drawings.

DETAILED DESCRIPTION OF THE PREFERRED EMBODIMENTS

Figure 1:
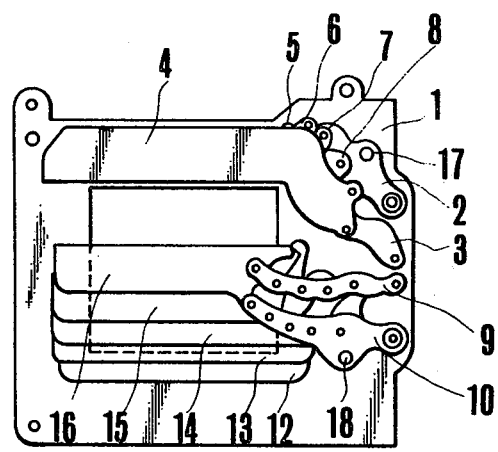
FIG. 1 is a plan view showing by way of example a focal plane shutter.
Figure 2:
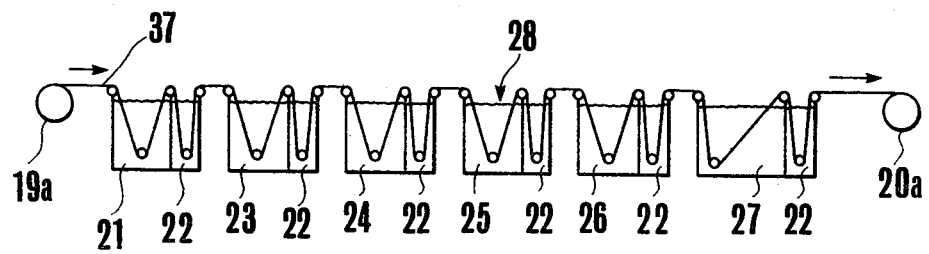
FIG. 2 is a plan view schematically showing the arrangement of a metal plating device.
Figure 3:
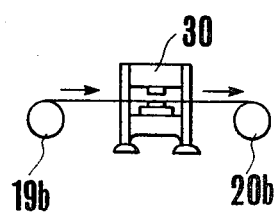
FIG. 3 is a schematic illustration of the arrangement of a press.
Figure 4:
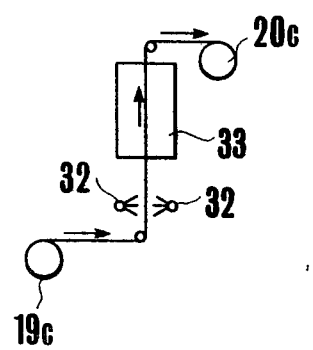
FIG. 4 is a schematic illustration of the arrangement of a coating device.
Figure 5:
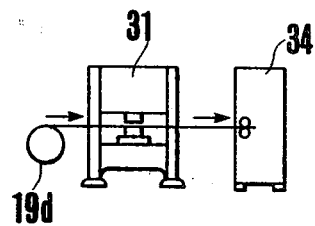
FIG. 5 is a schematic illustration of the arrangement of another press.
Figure 6:
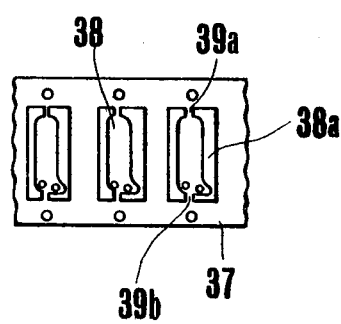
FIG. 6 is a plan view showing the shape of shutter screen blades obtained when a thin sheet material is processed through the press shown in FIG. 3.
Figure 7:
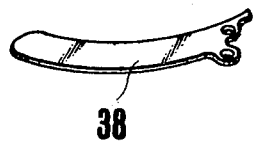
FIG. 7 is an oblique view showing a warped shutter screen blade.

An embodiment of the invention comprises arrangements shown in FIGS. 3, 4 and 5. In accordance with the invention, the thin sheet-like material to be used is prepared, for example, by applying sand-blasting to both sides of a polyester film material. In FIG. 2, a reference numeral 28 indicates a metal plating device. A thin sheet-like material 37 moved forward by a feeder 19a is arranged to come through a dewaxing tank 21, a preetching tank 23, an etching tank 24, a catalyst tank 25, an accelerator tank 26 and a chemical nickel plating tank 27 before the material is taken up by a wind-up device 20a. In this arrangement, a water washing tank 22 is disposed behind each of the solution tanks arranged in the material feeding direction. FIG. 3 shows a press 30. The metal plated thin sheet-like material 37 is continuously fed to the press 30, which performs a first press operation to punch the sheet material into a form as shown in FIG. 6. In FIG. 6, portions 38a of the thin sheet material are cut out by punching through the first press operation. FIG. 4 shows a coating arrangement. The arrangement includes a spray device 32 for spraying a coating material at the thin sheet-like material 37. The sprayed coating material is dried through a drying device 33. In this process of coating, the thin sheet-like material 37 is allowed to move forward while tension is applied thereto in the moving direction thereof by the feeding device 19c and the wind-up device 20c. FIG. 5 shows another press 31 which is provided for carrying out a second press operation to have the shutter screen blades formed off the thin sheet-like material 37 by punching. After the press 31, the residual material is fed to a scrap cutter 34. The embodiment which is arranged as described in the foregoing is operated for the manufacture of shutter screen blades in the following manner:

With the thin sheet-like material 37 placed on the metal plating device 28, the feeder 19a is operated to move the thin sheet material 37 forward. The material 37 is guided by guide rollers and passes through the dewaxing tank 21, the water washing tank 22, the preetching tank 23, the water washing tank 22, the etching tank 24, the water washing tank 22, the catalyst tank 25, the water washing tank 22, the accelerator tank 26, the water washing tank 22, the chemical nickel plating tank 27 and another water washing tank 22. The thin sheet-like material 37 is thus metal plated (chemical nickel plating) through these tanks. The metal plated thin material is then taken up by the wind-up device 20a. After that, the metal plated thin sheet-like material 37 is mounted on a feeder 19b of the press 30. The feeder 19b and the press 30 are operated to have shutter screen blades 38 formed one after another from the thin sheet-like material 37 in a continuous manner as shown in FIG. 6.

Since the thin sheet-like material 37 is not punched out completely along the entire contour of each shutter screen blade by this press operation, the shutter screen blades 38 are conveyed together with the thin sheet-like material and are thus taken up by the wind-up device 20b. The pressed thin sheet-like material 37 is then mounted on the coating device. At the coating device, the spray 32 is operated to have a coating material sprayed at the shutter screen blades formed on the thin sheet-like material 37 while it is fed from the feeder 19c. The coating material thus sprayed at the screen blades 38 is dried through the drying device 33. In this instance, tension is applied to the thin sheet-like material while the longitudinal direction of the screen blades 38 formed on the material 37 coincides with the transverse direction of the thin material 37. The end parts 39a and 39b of the blades 38 are thus kept in a state of being connected to the thin sheet-like material 37. This ensures that the shutter screen blades never warp while the material 37 is taken up and wound round the wind-up device 20c. Then, the thin sheet-like material 37 thus processed is mounted on another press 31. Press operations are carried out while the material is continuously fed from the feeder 19. The above stated end parts 39a and 39b are then cut off the material 37 and the shutter screen blades 38 are thus taken off the material one after another. The remaining portion of the material 37 is fed to the scrap cutter 34 to complete the shutter screen blade manufacturing process.

Figure 8:
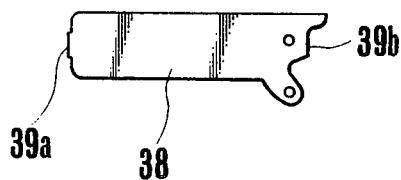
FIG. 8 is a plan view showing the shape of a shutter screen blade obtained when the thin sheet material is processed through the press shown in FIG. 5.
Figure 9:
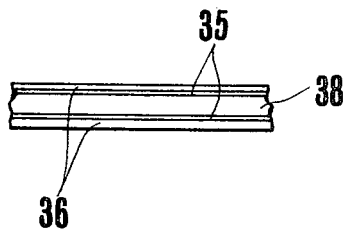
FIG. 9 is a sectional view of the shutter screen blade shown in FIG. 8.

The shape of each shutter screen blade obtained from the thin sheet-like material by punching it with the press 31 is as shown in FIG. 8. The sectional shape of it is as shown in FIG. 9 in which a reference numeral 35 indicates metal plating layers and a numeral 36 indicates coating films of a coating material.

As will be understood from the detailed description given above, in accordance with the invention, each of the screen blades is formed on a metal plated thin sheet-like plastic material by punching it out with the first press means with end parts left connected to other portions of the plastic material. The shutter screen blades thus formed are coated with a coating material and dried under this condition while being still connected to the plastic material. Then, the connected end parts are cut off the thin plastic sheet material by the second press means. The shortcomings of the conventional processes can be eliminated and the shutter screen blades can be improved in flatness in accordance with the invented process.

The shutter screen blades obtained from a plastic material in accordance with the invention can be assembled in a focal plane shutter. With these blades used, a focal plane shutter can be arranged to have a high shutter speed and to excel in the travelling performance and light shielding capability of the shutter screens. Since each step of the invented process is carried out while keeping a thin sheet-like plastic material moving, the invention permits a continuous production system capable of carrying out the manufacture of shutter screen blades at a high degree of efficiency.

While the invention has been described with regard to shutter screen blades to be used for a focal plane shutter, it will be understood from the foregoing description of the embodiment thereof that the invention is also applicable to the manufacture of blades for a lens shutter.

While a specific embodiment of the invention has been shown and described in detail to illustrate the application of the inventive principles, it will be understood that the invention may be embodied otherwise without departing from such principles.

What is claimed is:

1. A process for manufacturing shutter screen blades comprising the steps of:
   providing a continuous longitudinal strip of plastic sheet material and feeding said sheet material in the longitudinal direction thereof;
   performing a first punching operation on said sheet material in a press apparatus to form in said sheet material partially cutout portions with an outline in the form of shutter screen blades having a longer dimension and a shorter dimension, said cutout portions being formed with said longer dimension extending transversely to said longitudinal direction of said plastic strip and with parts of each outline retained connected with said strip material at points proximate both ends of said longer dimension;

coating said plastic strip including said cutout portions with a metal layer by passing said strip through a metal plating operation;

drying said metal coating by passing said sheet material through drying apparatus, said sheet material being held under a longitudinal tension during said drying step; and performing a second punching operation to separate said shutter screen blades from said strip by severing said parts of said outlines which were retained connected with said strip material after said first punching operation thereby to separate said shutter screen blades from said strip.

* * * * *